Sept. 1, 1936.   J. SCOTT   2,052,945
INSECT AND RODENT EXTERMINATOR
Original Filed Sept. 13, 1932
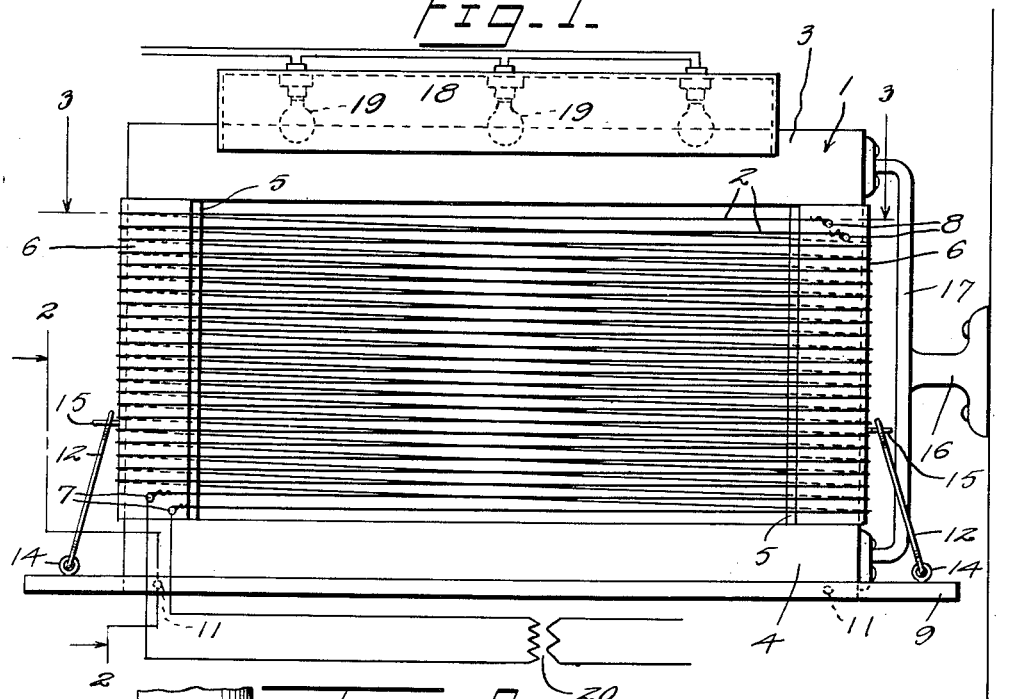
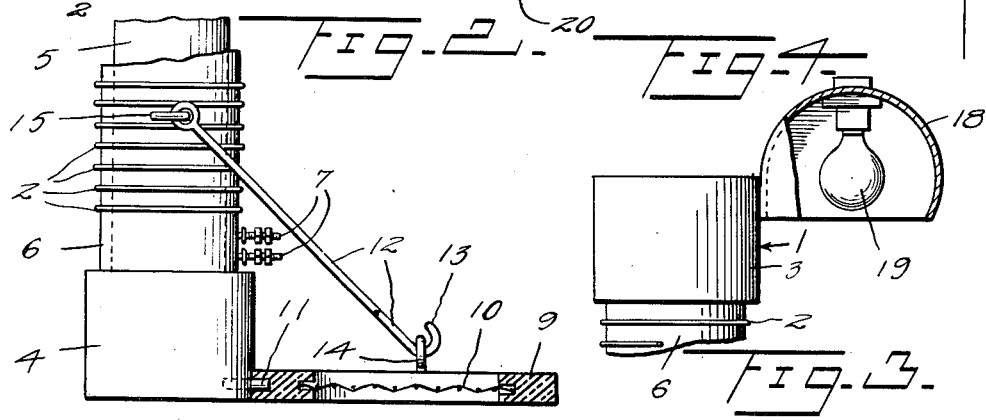
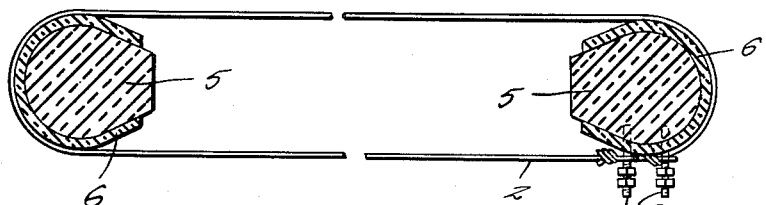
Jesse Scott
By Watson E. Coleman
Attorney Patented Sept. 1, 1936

2,052,945

UNITED STATES PATENT OFFICE

2,052,945

INSECT AND RODENT EXTERMINATOR

Jesse Scott, Tres Piedras, N. Mex., assignor of one-half to John A. Robinson, Rocky Ford, Colo.

Refiled for abandoned application September 13, 1932, Serial No. 633,009. Divided and this application March 19, 1936, Serial No. 69,707

2 Claims. (Cl. 43—112)

This invention relates to devices for killing insects, rodents or other vermin, and relates particularly to a device for electrocuting the same.

The primary object of the present invention is to provide a new and novel insect and rodent killer consisting of a frame structure having a series of spaced wires which are adapted to be electrically charged so that any insect or small animal, such as a mouse or a rat, will be instantly killed upon alighting upon and connecting two or more of the wires with its body.

Another object of the invention is to provide an insect killing device which is adapted to be placed in any position upon a flat supporting surface or mounted upon a wall adjacent a door opening and which is provided with means for catching the insects or rodents so that the same, as they are killed, will not fall upon the floor.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:

Figure 1 is a view in side elevation of the device embodying the present invention showing the same mounted upon a vertical supporting surface.

Fig. 2 is a view of one end of the structure, the insect or rodent catching portion of the device being taken in section upon the line 2—2 of Fig. 1.

Fig. 3 is a sectional view taken substantially upon the line 3—3 of Fig. 1.

Fig. 4 is a view in end elevation of the upper portion of the frame, showing a portion of the lighting structure therefor in section.

Referring now more particularly to the drawing wherein like numerals of reference indicate corresponding parts throughout the several views, the numeral 1 indicates the main frame portion of the present device, upon which are wound the current carrying wires 2. This frame 1 comprises a pair of horizontal bars which are indicated by the numerals 3 and 4 and the vertical side bars 5 which connect the horizontal bars.

These side bars 5 are each covered by a suitable insulation material 6, such, for example, as asbestos or the like, and the wires 2 are wound, as shown, about the frame from one side bar 5 to the other.

There are two of the wires 2 and these are wound in spaced side-by-side relation, starting at the binding posts 7 at the bottom of the frame and terminating at the pins 8 at the top of the frame, passing over and in contact with the insulation coverings 6 of the side bars, as shown in Fig. 3.

At one side of the wire carrying frame 1 there is positioned the horizontal tray frame 9 which has a wire fabric center 10 as shown in Fig. 2. This frame has one side edge in abutting relation with the bottom bar 4 of the current wire frame and is connected therewith by dowels 11 in the manner shown. The outer edge or side of the tray frame 9 is supported by the hooked bars 12 the outer ends of which are formed to provide the hook bills 13 which engage through eyes 14 carried by the frame 9, while the inner ends are connected in a suitable manner with the side bars 5, as for example, by the use of the eyes 15.

As will be readily appreciated, this frame structure 4 may be set up upon a table or upon the floor in any suitable position or it may be mounted at the side of a window or door opening. In order to facilitate its being mounted at an opening, there is provided a bracket 16 having the lateral arms 17 which are secured at their ends to the ends of the top and bottom rails of the main frame, straddling the current carrying wires 2 in the manner illustrated.

The present device may also be used for killing such insects as moths or other night bugs which are attracted by a light and for this purpose there is mounted upon the top bar 3 a light reflector 18 within which are mounted incandescent bulbs 19 which may be supplied with current from any suitable source. This light structure is mounted upon the same side of the frame as the tray 9 so that the insects attracted to the light and alighting upon the wires thereunder will fall, after being killed, onto the tray.

Where it is desirable that the current supplied to the wires 2 be changed or altered, there may be employed a transformer, as indicated at 20. Use of such a transformer may be made, where the voltage of the electric current supplied to the house in which the device is used is insufficient to kill all insects or rodents, to step up the voltage to the required value.

It will, of course, be readily understood that the spaced wires 2 form a break in the circuit in which the device is connected and that this break is closed to complete the circuit by and through the body of an insect or an animal alighting upon and connecting the two wires.

From the foregoing it will be readily seen that with a device of this character, flies and other insects, as well as rodents, may be readily gotten rid of, particularly those insects which are attracted to light, when the device is used with the light structure mounted upon the top thereof.

It will also be appreciated that while the device has been shown with a tray attached for the purpose of catching any insects or rodents which may be killed through contact with the wires, the tray may be removed so as to facilitate the use of the device in places where the tray would be undesirable.

I claim:

1. In combination with an insect and rodent destroyer, comprising a rectangular frame having horizontal top and bottom bars and vertical connecting end bars and electrically charged spaced wires connecting said end bars, means for catching insects and rodents killed by the device, comprising a rectangular tray-like structure having one edge abutting the bottom horizontal bar of the frame, and detachable connecting means between the frame and the tray for supporting the latter in a plane substantially perpendicular to the plane of the frame.

2. In combination with an insect and rodent destroyer, comprising a rectangular frame having horizontal top and bottom bars and vertical connecting end bars and electrically charged spaced wires connecting said end bars, means for catching insects and rodents destroyed upon the electrically charged wires comprising a rectangular frame constituting a tray, the said tray having one edge abutting the bottom horizontal rail of the first frame and having apertures in said edge, pin members in and projecting from the said bottom bar of the first frame and engaging in said apertures of the tray frame, and hook members attached to the vertical bars of the first frame and having detachable connection with the tray frame to detachably hold the latter in a plane substantially perpendicular to the plane of the first frame.

JESSE SCOTT.